US012599884B2

(12) United States Patent
Park et al.

(10) Patent No.: US 12,599,884 B2
(45) Date of Patent: Apr. 14, 2026

(54) CIRCULATING FLUIDIZED BED REACTOR USING ELECTRIC HEATING FURNACE

(71) Applicant: KOREA RESEARCH INSTITUTE OF CHEMICAL TECHNOLOGY, Daejeon (KR)

(72) Inventors: Yong Ki Park, Daejeon (KR); Do Kyoung Kim, Daejeon (KR); Na Young Kang, Daejeon (KR); Jaedeuk Park, Daejeon (KR); Young Kyu Hwang, Daejeon (KR); Ki Woong Kim, Daejeon (KR); In Hyoup Song, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 221 days.

(21) Appl. No.: 18/690,514

(22) PCT Filed: Sep. 6, 2022

(86) PCT No.: PCT/KR2022/013328
§ 371 (c)(1),
(2) Date: Mar. 8, 2024

(87) PCT Pub. No.: WO2023/038391
PCT Pub. Date: Mar. 16, 2023

(65) Prior Publication Data
US 2025/0128227 A1 Apr. 24, 2025

(30) Foreign Application Priority Data
Sep. 10, 2021 (KR) ........................ 10-2021-0120731

(51) Int. Cl.
*B01J 8/18* (2006.01)
*B01J 8/26* (2006.01)
*C10G 11/18* (2006.01)

(52) U.S. Cl.
CPC .......... *B01J 8/1836* (2013.01); *B01J 8/1827* (2013.01); *B01J 8/1854* (2013.01); *B01J 8/26* (2013.01);
(Continued)

(58) Field of Classification Search
CPC ...... B01J 8/1836; B01J 8/1827; B01J 8/1854; B01J 8/26; B01J 2208/00398;
(Continued)

(56) References Cited

U.S. PATENT DOCUMENTS 6,746,650 B1 6/2004 Lesieur
12,012,555 B2 * 6/2024 Kashyap ................ B01J 8/1845
(Continued)

FOREIGN PATENT DOCUMENTS

JP 2019-219116 A 12/2019
KR 10-0632563 B1 10/2006
(Continued)

OTHER PUBLICATIONS

International Search Report for PCT/KR2022/013328 dated Dec. 9, 2022.

*Primary Examiner* — Ellen M McAvoy
(74) *Attorney, Agent, or Firm* — Sughrue Mion, PLLC

(57) ABSTRACT

Provided is a process of manufacturing light olefins, which is a fluidized bed catalytic naphtha cracking process having improved economic feasibility and decreased greenhouse gas emissions. The process of manufacturing light olefins according to the present invention has a decreased hot spot occurring when supplying an additional fuel oil and decreased tendency of catalyst deactivation by water, thereby improving economic feasibility of the process and reducing greenhouse gas emissions to allow construction of an environmentally friendly process.

14 Claims, 4 Drawing Sheets

(52) U.S. Cl.
CPC ... *C10G 11/182* (2013.01); *B01J 2208/00398* (2013.01); *C10G 2300/1003* (2013.01); *C10G 2300/1011* (2013.01); *C10G 2400/20* (2013.01)

(58) Field of Classification Search
CPC .......... C10G 11/182; C10G 2300/1003; C10G 2300/1011; C10G 2400/20; C10G 11/18
See application file for complete search history.

(56) References Cited

U.S. PATENT DOCUMENTS

| | | | | |
|---|---|---|---|---|
| 2011/0266197 A1* | 11/2011 | Pinho | ..................... | C10G 11/02 |
| | | | | 208/120.35 |
| 2013/0137909 A1* | 5/2013 | Dean | ..................... | C10G 35/04 |
| | | | | 585/324 |
| 2017/0253811 A1* | 9/2017 | Kang | ..................... | C10G 3/42 |

| | | | | |
|---|---|---|---|---|
| 2018/0050969 A1* | 2/2018 | Bhuyan | .................. | C10G 57/02 |
| 2021/0171344 A1* | 6/2021 | Mortensen | ............ | B01J 15/005 |
| 2022/0119717 A1* | 4/2022 | Zhao | ..................... | C10G 11/18 |

FOREIGN PATENT DOCUMENTS

| | | | | |
|---|---|---|---|---|
| KR | 10-0651329 B1 | 11/2006 | | |
| KR | 10-0857547 B1 | 9/2008 | | |
| KR | 10-2009-0045519 A | 5/2009 | | |
| KR | 10-2010-0024475 A | 3/2010 | | |
| KR | 10-2014-0049033 A | 4/2014 | | |
| KR | 10-2014-0130603 A | 11/2014 | | |
| KR | 10-2020-0078012 A | 7/2020 | | |
| KR | 10-2021-0014677 A | 2/2021 | | |
| WO | WO-9527019 A1 * | 10/1995 | ............ | C10G 11/18 |
| WO | 2004/091773 A1 | 10/2004 | | |
| WO | WO-2013016660 A1 * | 1/2013 | ............ | C10G 35/04 |

* cited by examiner

【FIG. 1】
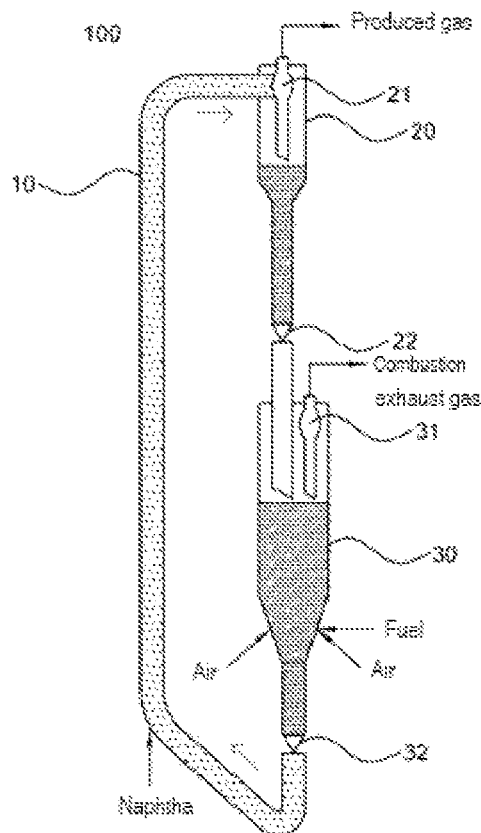

【FIG. 2】
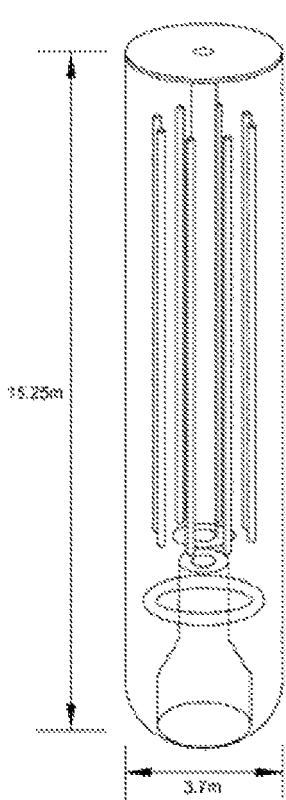

【FIG. 3】
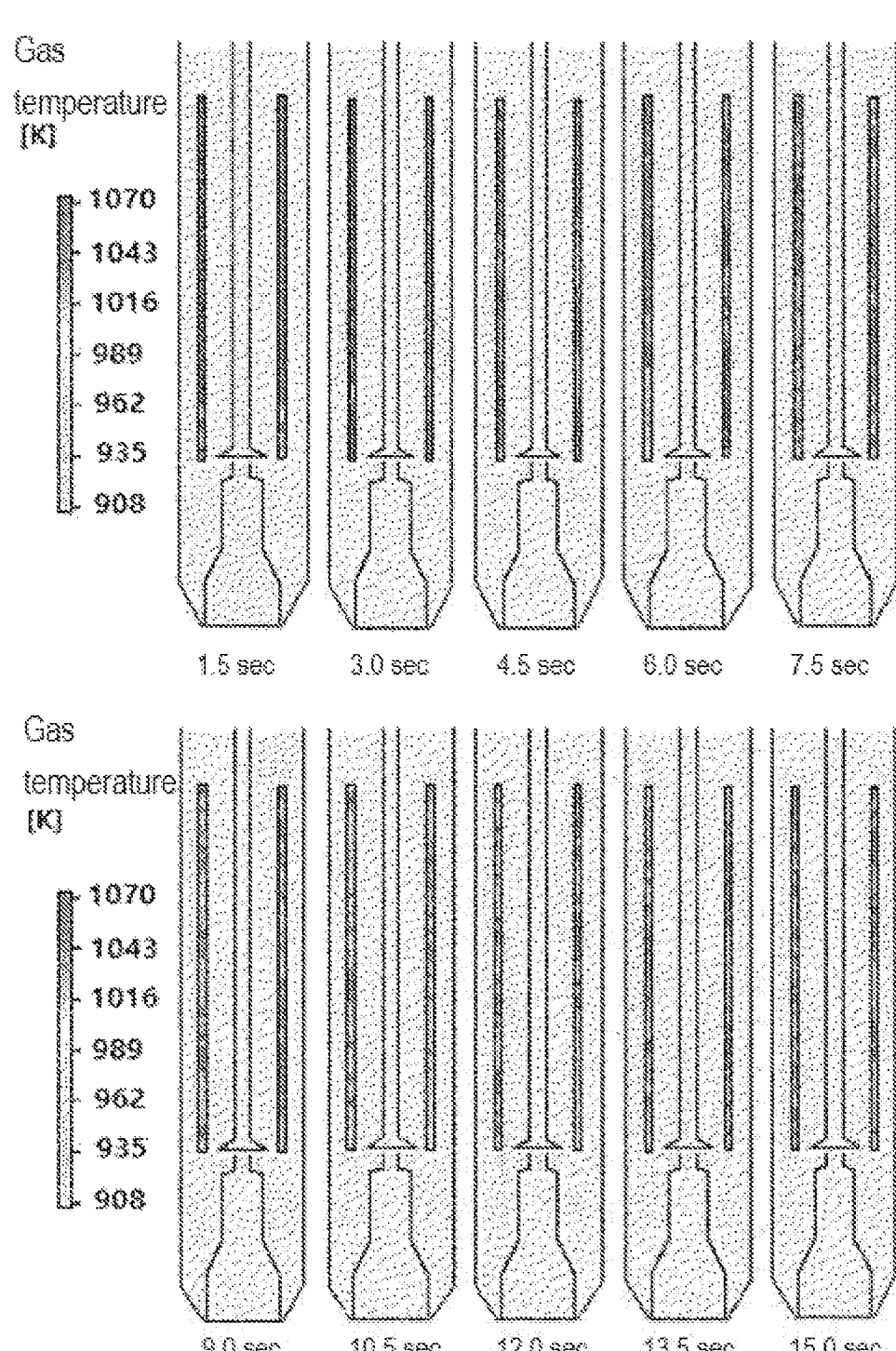

【FIG. 4】
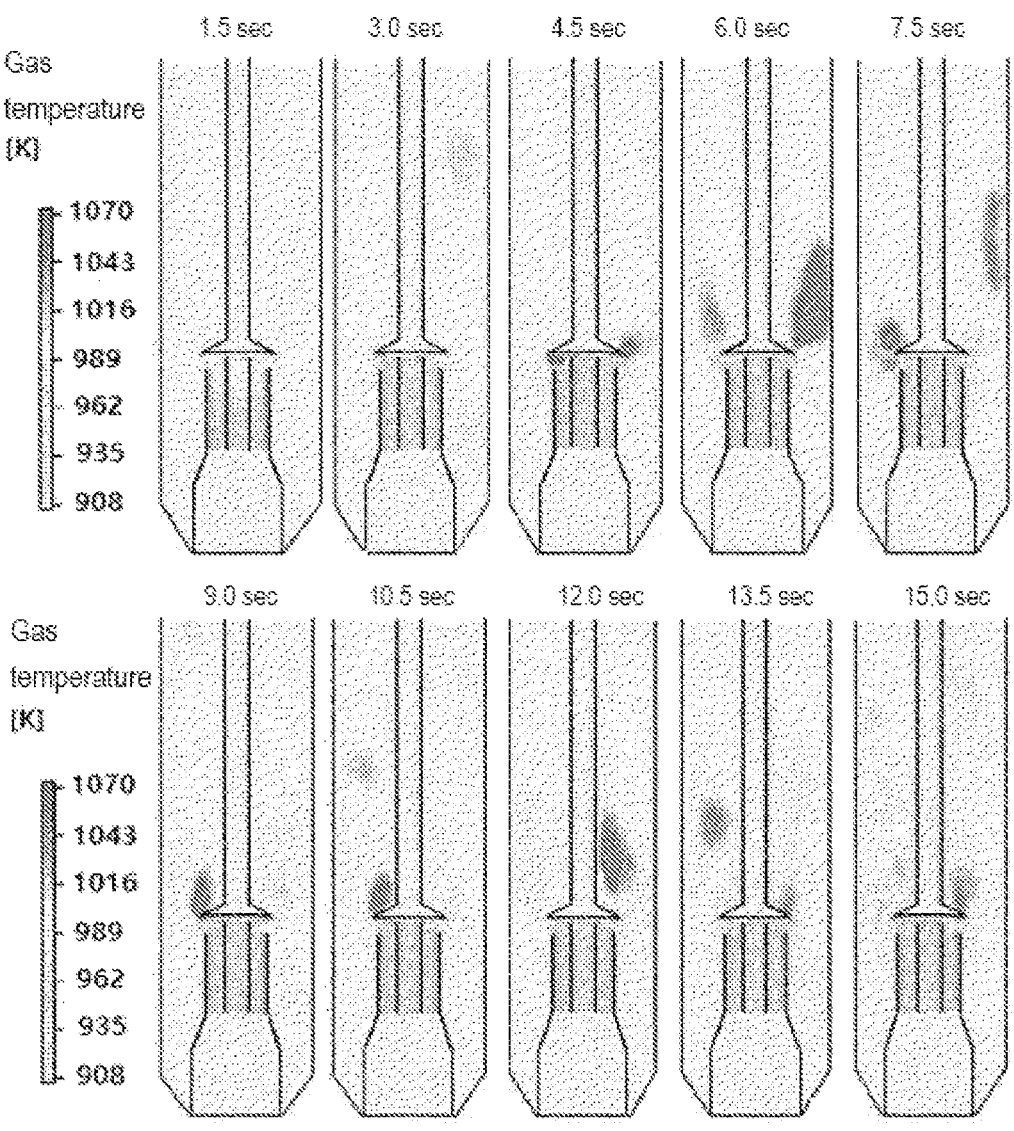

CIRCULATING FLUIDIZED BED REACTOR USING ELECTRIC HEATING FURNACE

CROSS REFERENCE TO RELATED APPLICATIONS

This application is a National Stage of International Application No. PCT/KR2022/013328 filed Sep. 6, 2022, claiming priority based on Korean Patent Application No. 10-2021-0120731 filed Sep. 10, 2021, the entire disclosures of which are incorporated herein by reference.

TECHNICAL FIELD

The present invention relates to a circulating fluidized bed reactor which may improve economic feasibility and reduce greenhouse gas emissions during manufacture of light olefins through a circulating fluidized bed catalytic naphtha cracking process.

BACKGROUND ART

Olefins, in particular, light olefins such as ethylene and propylene are widely used in the petrochemical industry and, in general, light olefins are produced by pyrolyzing (steam cracking) naphtha under coexistence of water vapor. Currently, since a steam cracking process is performed at a reaction temperature of 800-900° C. due to the characteristics of an endothermic reaction, it uses a large amount of energy, which accounts for about 40% of energy consumed in the entire petrochemical industry and about 60% of greenhouse gas emissions. In addition, since a currently applied steam cracking technology is less competitive due to an increase in ethane cracker derived from shale gas which selectively produces ethylene, development of an olefin manufacturing technology which may selectively produce propylene is demanded.

In order to reduce environmental pollution and solve an economic feasibility problem, Korean Patent Registration Nos. 10-0651329 and 10-0632563 introduce a technology of improving energy efficiency and increasing a propylene yield as compared with a conventional naphtha cracking process through a circulating fluidized bed catalytic naphtha cracking process.

The circulating fluidized bed catalytic cracking process includes a cracking process of heavy oil such as normal pressure residual oil, reduced pressure residual oil, and gas oil, in addition to the naphtha cracking process. In both processes, a granular catalyst and a feedstock enter a reactor under specific reaction conditions, and undergo a similar process in which a reactor effluent is usually separated in a cyclone separator and a reacted catalyst is regenerated in a regenerator and then recirculated to the reactor.

However, there is an important difference in a regenerator between the operations in the circulating fluidized bed catalytic naphtha cracking process and the circulating fluidized bed catalytic heavy oil cracking process. The circulating fluidized bed catalytic heavy oil cracking process forms a significant amount of coke in a riser which is a reactor due to the characteristics of a raw material, and the coke is deposited on catalyst particles. Heat produced during a process in which the coke reacts with air injected in a regenerator and burns is used as a fuel source required for heavy oil cracking in the reactor.

However, since the circulating fluidized bed catalytic naphtha cracking process produces a smaller amount of coke due to the characteristics of the raw material, only an amount of heat produced during catalyst combustion is insufficient to be used as a fuel source required for naphtha cracking. In order to solve the problem, U.S. Pat. No. 7,153,479 introduces a device which supplies additional fuel to a regenerator and burns the fuel with air inside the regenerator, thereby supplying an additional amount of heat needed.

When the coke deposited on the catalyst burns in the regenerator, hot spot occurrence is minimized by a wide and uniform distribution of coke and a uniform temperature gradient in the regenerator is shown, but when an additionally supplied fuel (fuel gas or fuel oil) is applied, a hot spot occurs in a specific area in the regenerator. Water produced during combustion of fuel at the occurring hot spot rapidly reduces activity of a catalyst used in the circulating fluidized bed catalytic naphtha cracking process, thereby causing a yield decrease of the entire reaction and frequent catalyst replenishment to adversely affect economic feasibility. In addition, carbon dioxide produced during combustion of fuel becomes a factor which increases greenhouse gas emissions.

Therefore, development of a regenerator which allows removal of a hot spot and reduction of carbon dioxide occurrence for improving economic feasibility and decreasing greenhouse gas emissions in a circulating fluidized bed catalytic naphtha cracking process is demanded.

DISCLOSURE

Technical Problem

An object of the present invention is to provide a reactor available for a circulating fluidized bed circulating fluidized bed process, which may selectively produce light olefins such as ethylene and propylene with high yield and high selectivity.

Another object of the present invention is to provide a reactor available for a circulating fluidized bed catalytic naphtha cracking process, which may improve economic feasibility and reduce greenhouse gas emissions.

Technical Solution

In one general aspect, a circulating fluidized bed reactor includes: a reactor, a stripper, and a regenerator, wherein an electric heating furnace including a heating body is installed in the regenerator.

In the circulating fluidized bed reactor according to an exemplary embodiment of the present invention, a heating method of the electric heating furnace installed in the regenerator may be resistance heating.

In the circulating fluidized bed reactor according to an exemplary embodiment of the present invention, the heating body may be a heating rod.

In the circulating fluidized bed reactor according to an exemplary embodiment of the present invention, a surface temperature of the heating rod may be 750 to 1200° C., a diameter of the heating rod (pipe outside diameter) may be 1 to 15 cm, the number of the heating rods per unit area (m²) of the regenerator may be 1 to 15, and a distance between the heating rods may be 15 to 85 cm.

In the circulating fluidized bed reactor according to an exemplary embodiment of the present invention, a spherical or oval catalyst including a binder and a matrix may circulate in the circulating fluidized bed reactor, and the catalyst may have a diameter of 10 to 250 μm.

In the circulating fluidized bed reactor according to an exemplary embodiment of the present invention, the circulating fluidized bed reactor may be used in a circulating fluidized bed catalytic naphtha cracking process.

In another general aspect, a method of producing light olefins by cracking naphtha using the circulating fluidized bed reactor is provided.

In the method of producing light olefins using a circulating fluidized bed reactor according to an exemplary embodiment of the present invention, the naphtha may be $C_4$ to $C_{15}$ saturated hydrocarbons or unsaturated hydrocarbons, and may be one or more selected from the group consisting of full-range naphtha, light naphtha, raffinate oil, plastic pyrolysis oil, biomass pyrolysis oil, and a mixture thereof.

In still another general aspect, a method of improving a yield of light olefins by cracking naphtha using the circulating fluidized bed reactor is provided.

Advantageous Effects

In a process of manufacturing light olefins by the circulating fluidized bed catalyst reactor using an electric heating furnace according to the present invention, a hot spot occurring during the supply of additional fuel gas or fuel oil and catalyst deactivation tendency by water is decreased, and thus, economic feasibility is improved and greenhouse gas emissions are reduced to allow construction of an environmentally friendly process.

DESCRIPTION OF DRAWINGS

The above and other objects, features and advantages of the present invention will become apparent from the following description of preferred embodiments given in conjunction with the accompanying drawings, in which:

FIG. 1 is a schematic diagram showing an example of a circulating fluidized bed reactor used in a circulating fluidized bed catalytic naphtha cracking process according to the present invention, FIG. 2 is a schematic diagram showing an example in which an electric heating furnace is installed in a regenerator included in the circulating fluidized bed reactor, FIG. 3 is results of numerical analysis of hot spot occurrence in the regenerator over time when the electric heating furnace is installed in the regenerator included in the circulating fluidized bed reactor, and FIG. 4 is results of numerical analysis of hot spot occurrence in the regenerator over time when ethylene is supplied as an additional fuel in the regenerator included in the circulating fluidized bed reactor.

BEST MODE

Hereinafter, the circulating fluidized bed reactor of the present invention will be described in detail with reference to the accompanying drawings.

The drawings to be provided below are provided by way of example so that the spirit of the present invention can be sufficiently transferred to a person skilled in the art to which the present invention pertains. Therefore, the present invention is not limited to the drawings provided below but may be embodied in many different forms, and the drawings suggested below may be exaggerated in order to clear the spirit of the present invention.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

In addition, the singular form used in the specification and claims appended thereto may be intended to include a plural form also, unless otherwise indicated in the context.

In the present specification and the appended claims, the terms such as "first" and "second" are not used in a limited meaning but are used for the purpose of distinguishing one constituent element from other constituent elements.

In the present specification and the appended claims, the terms such "comprise" or "have" mean that there is a characteristic or a constituent element described in the specification, and as long as it is not particularly limited, a possibility of adding one or more other characteristics or constituent elements is not excluded in advance.

However, since the conventionally suggested circulating fluidized bed catalytic naphtha cracking process technology produces a smaller amount of coke, only an amount of heat generated during catalyst combustion is insufficient to be used as a fuel source required for naphtha cracking. In addition, when fuel gas or fuel oil is further supplied as an additional fuel source and used, water produced during combustion of fuel at a hot spot occurring in a specific area in a regenerator inhibits activity of the catalyst. Therefore, there is a need to install an electric heating furnace, not fuel gas or fuel oil as an additional fuel source in the regenerator to decrease the hot spot, so that a temperature gradient in the regenerator is uniform.

Thus, the present invention provides a circulating fluidized bed reactor including: a reactor, a stripper, and a regenerator, wherein an electric heating furnace including a heating body is installed in the regenerator.

In FIG. 1, an example of the circulating fluidized bed reactor which performs a circulating fluidized bed catalytic naphtha cracking process as a schematic diagram, and the circulating fluidized bed catalytic naphtha cracking process according to the present invention will be described in detail with reference thereto.

In a specific example, a circulating fluidized bed reactor 100 used in the circulating fluidized bed catalytic naphtha cracking process according to the present invention may include a reactor 10, a stripper 20, and a regenerator 30.

In the reactor 10, injected naphtha and a catalyst are mixed to perform a naphtha cracking reaction to produce olefins. A lower portion of the reactor 10 may be connected to the regenerator 30, and may further include a valve 32 for dividing the regenerator 30 and the reactor 10 and adjusting a circulating flow of the catalyst and a combustion exhaust gas.

In addition, the reactor 10 may be a riser. The riser may have a length of 1 to 30 m, preferably 2 to 28 m, more preferably 3 to 26 m, still more preferably 4 to 23 m, and most preferably 5 to 20 m, but is not limited thereto. In addition, the riser may have a diameter of 0.1 to 5.0 cm, preferably 0.2 to 4.5 cm, more preferably 0.3 to 4.0 cm, still more preferably 0.4 to 3.5 cm, and most preferably 0.5 to 3 cm, but is not limited thereto.

The stripper 20 may include a cylinder 21 for releasing gas produced from naphtha. Furthermore, the regenerator 30 may be disposed in the lower portion of the stripper, and a valve 22 for dividing the stripper 20 and the regenerator 30 and adjusting the circulating flow of the catalyst and the combustion exhaust gas may be further included.

The regenerator 30 may further include a cylinder 31 for releasing the combustion exhaust gas. The regenerator 30 may be filled with the catalyst, and a pipe into which air and fuel gas or fuel oil may be injected may be formed in the lower portion of the regenerator 30. In addition, it is preferred that the reactor 10 is connected to the lower portion of the regenerator 30, and a valve 32 for dividing the regenerator 30 and the reactor 10 and adjusting the circulating flow of the catalyst and the combustion exhaust gas may be further included.

In the case of the circulating fluidized bed catalytic naphtha cracking process, since the catalyst is mainly present in the lower portion of the regenerator 30, a combustion reaction is concentrated near a pipe designed for injecting air. In general, catalyst reactivation is performed by combustion heat produced in a combustion reaction of recycled fuel, and since the catalyst is mainly present in the lower portion of the regenerator 30, the combustion reaction is not uniformly performed inside a catalyst regenerator. In the case in which the combustion reaction is not uniformly performed inside the regenerator, a hot spot, a dead zone, corrosion due to a gas flow including the catalyst, and the like may occur to excessively transfer heat to reduce catalytic efficiency.

Therefore, in order to solve the problem arising from reactivation of the catalyst by the combustion heat produced in the combustion reaction of the recycled fuel, an electric heating furnace may be installed in the regenerator 30, and the electric heating furnace may include a heating body.

Herein, a schematic diagram in which the electric heating furnace is installed in the regenerator included in the circulating fluidized bed reactor is shown in FIG. 2, and the regenerator in the circulating fluidized bed reactor according to the present invention and a process of manufacturing light olefins using the regenerator will be described in detail with reference thereto.

In a specific example, the electric heating furnace installed in the regenerator inside the circulating fluidized bed reactor may include a heating body. A non-limiting example of the heating body may include a heating rod, a heating wire, a heating plate, a heating mesh, and the like, and it is most preferred to use a form of a heating rod, but the present invention is not limited thereto.

In a specific example, a heating method of the electric heating furnace installed in the regenerator inside the circulating fluidized bed reactor may include resistance heating, arc heating, induction heating, dielectric heating, infrared heating, and the like, and it is most preferred to use a resistance heating form, but the present invention is not limited thereto.

In a specific example, the electric heating furnace installed in the regenerator inside the circulating fluidized bed reactor may include a heating rod. The heating rod included in the electric heating furnace may have a length of 1 to 15 m, preferably 2 to 14 m, more preferably 3 to 13 m, and most preferably 4 to 12 m, but is not limited thereto.

In addition, the diameter of the heating rod (pipe outside diameter) included in the electric heating furnace may be 0.1 to 15.0 cm, preferably 3.0 to 14.0 cm, more preferably 5.0 to 13.0 cm, and most preferably 8.0 to 12.0 cm, but is not limited thereto.

In addition, the surface temperature of the heating rod included in the electric heating furnace may be 750 to 1200° C., preferably 800 to 1150° C., more preferably 850 to 1100° C., and most preferably 900 to 1050° C., but is not limited thereto.

In addition, the number of the heating rods per unit area (m²) of the regenerator included in the electric heating furnace may be 1 to 15, preferably 2 to 14, and most preferably 3 to 13, but is not limited thereto.

In addition, a distance between the heating rods included in the electric heating furnace may be 15 to 85 cm, preferably 25 to 75 cm, and most preferably 30 to 70 cm, but is not limited thereto.

As described above, when the electric heating furnace is installed in the regenerator inside the circulating fluidized bed reactor, the electric heating furnace may be installed only in the regenerator, and thus, a problem of supplying heat to a separate reactor in a conventional naphtha cracking process may be solved.

Not only general electricity but also electricity derived from renewable energy such as solar power, wind power, and hydroelectric power and a form of electricity which stores it may be supplied to the electric heating furnace.

In addition, the present invention provides a method of producing light olefins by cracking naphtha using a circulating fluidized bed reactor including the reactor, a stripper, and a regenerator, characterized in that an electric heating furnace including a heating body is installed in the regenerator, and a method of improving a yield of the light olefins.

Hereinafter, a method of producing light olefins using the circulating fluidized bed reactor according to the present invention will be described in detail.

In a specific example, naphtha used as a reactant may include $C_4$ to $C_{15}$ saturated hydrocarbons or unsaturated hydrocarbons, and the type of naphtha may be full-range naphtha, light naphtha, raffinate oil, plastic pyrolysis oil, biomass pyrolysis oil, and a mixture thereof. Among them, full-range naphtha is an oil fraction including $C_2$-$C_{15}$ hydrocarbons which is directly produced in a crude oil refining process, may include paraffin, naphthene, aromatic compounds, and the like, and in some cases, may include olefin compounds. In addition, unlike a pyrolysis process using only saturated hydrocarbon, a circulating fluidized bed cracking process using a catalyst may also use hydrocarbons containing olefins as a reactant.

Usually, reaction performance depends on a temperature, a space velocity, and the like. Herein, in order to minimize energy consumption, reaction conditions considering a lowest possible temperature, an optimal conversion rate, olefin production amount, minimization of catalyst deactivation by coke production, and the like should be suggested.

In a specific example, a reaction temperature may be preferably 600 to 800° C., more preferably 630 to 750° C., and most preferably 650 to 720° C., but is not limited thereto. When the reaction temperature is lower than 600° C., a conversion rate is lowered, thereby rapidly reducing the yield of a desired product, and when the reaction temperature is higher than 800° C., most of the reactant is converted into coke to reduce the yield of the product.

In a specific example, a reaction pressure may be preferably 1.0 to 3.0 atm, more preferably 1.2 to 2.2 atm, and most preferably 1.3 to 2.0 atm, but is not limited thereto.

In a specific example, a volume ratio of naphtha/gas may be preferably 0.01 to 10, more preferably 0.1 to 2.0, and most preferably 0.3 to 1.0, but is not limited thereto.

In a specific example, a space velocity may be preferably in a range of 5 to 30 $h^{-1}$, more preferably in a range of 7 to 25 $h^{-1}$, and most preferably in a range of 10 to 20 $h^{-1}$. When the space velocity is less than 5 $h^{-1}$, a coke production amount is increased, and when the space velocity is more than 30 $h^{-1}$, the conversion rate of naphtha is rapidly reduced.

In addition, in the circulating fluidized bed reactor, the catalyst is circulated, and the catalyst may be a zeolite-based catalyst.

In a specific example, the catalyst may include a binder and a matrix, and the type of catalyst may be silica, alumina, or silica-alumina, but is not limited thereto.

In a specific example, the catalyst may be spherical or oval, and the diameter of the catalyst particles may be 10 to 250 μm, preferably 15 to 200 μm, and most preferably 20 to 180 μm, but is not limited thereto.

BEST MODE FOR CARRYING OUT THE INVENTION

Hereinafter, the present invention will be described in detail by the examples. However, the examples are for describing the present invention in more detail, and the scope of the present invention is not limited to the following examples.

<Example 1> Regenerator Including Electric Heating Furnace

In order to perform a circulating fluidized bed catalytic naphtha cracking process according to the present invention, a circulating fluidized bed reactor including a reactor, a stripper, and a regenerator, wherein an electric heating furnace was included in the regenerator, was prepared.

The electric heating furnace was installed in a catalyst and fluid path to which 8 heating rods in a riser form were introduced in order to provide energy required to raise a temperature inside the regenerator, as shown in the schematic diagram of FIG. 2. The diameter of each heating rod (pipe outside diameter) was 10.16 cm, the length of the heating rod was 10 m, and the surface temperature of the heating rod was maintained at 1000° C.

<Comparative Example> Design of Regenerator to which Additional Fuel Oil was Supplied The same circulating fluidized bed reactor as that of Example 1 except that energy was supplied by supplying ethylene as an additional fuel oil to the regenerator of the circulating fluidized bed reactor instead of the electric heating furnace was used.

<Experimental Example 1> Analysis of Hot Spot Depending on Naphtha Cracking

In order to confirm occurrence of a hot spot over time in the naphtha cracking process according to the present invention, a naphtha cracking process was performed using the circulating fluidized bed reactors including the regenerators of Example 1 and the comparative example, numerical analysis of occurrence of the hot spot in the regenerator was performed accordingly, and the results are shown in FIGS. 3 and 4.

In the present invention, a fluidized bed expert analysis model (computational particle flow dynamics; CPFD) to which a Lagrangian method in which a solid is regarded as a discontinuity was applied to perform flow and heat transfer analysis inside a catalyst regenerator.

Since in the CPFD simulation, a mesh is created using a Cartesian coordinate, when a complex circular structure is expressed as it is, too many meshes are needed to unnecessarily increase calculation time. Therefore, the mesh was minimized by simplifying the design of the catalyst regenerator, thereby allowing rapid calculation. Catalyst particles used in fluidized bed analysis were assumed to be perfect spheres, and the size is indicated as a particle distribution size (PSD) in Table 1. Temperature dependency of gas and phase equilibrium were calculated based on an ideal gas equation, and initial condition and boundary condition information may be confirmed in Table 2.

TABLE 1

| Catalyst particle diameter (μm) | Cumulative fraction (%) |
| --- | --- |
| 5 | 0 |
| 10 | 0.14 |
| 20 | 0.95 |
| 30 | 2.97 |
| 40 | 8.83 |
| 60 | 31.65 |
| 80 | 56.96 |
| 120 | 85.09 |
| 180 | 98.12 |
| 200 | 98.98 |
| 250 | 100 |

TABLE 2

| Initial conditions | | Boundary conditions | |
| --- | --- | --- | --- |
| Internal temperature | 730° C. | External pressure | 1.7 atm |
| Internal pressure | 2 atm | Catalyst injection speed | 90.5614 kg/s |
| Internal fluid | Nitrogen | Air injection speed | 60 m/s |
| Height of regenerator | 15.25 m | Catalyst fraction | 0.4 |

Initially, the process was started under the conditions of 730° C. in which the entire area of the regenerator was filled with nitrogen and catalyst particles. The initial volume fraction of naphtha/nitrogen was 0.4 and the process was started at 730° C.

Air injection was performed at 168.85° C., 60 m/s, 2.871 kg/s, and the reaction was performed at 0.5 m/s, 715° C. atm. The catalyst injection speed was 90.5614 kg/s.

FIG. 3 is results of numerical analysis of hot spot occurrence in the regenerator over time when the electric heating furnace was installed in the regenerator included in the circulating fluidized bed reactor according to Example 1.

When the electric heating furnace was installed, it was confirmed that the hot spot was decreased, so that a uniform temperature gradient near 1003 K which was the desired temperature was shown.

FIG. 4 is results of numerical analysis of hot spot occurrence in the regenerator over time when ethylene was supplied as an additional fuel in the regenerator included in the circulating fluidized bed reactor according to the comparative example.

When an additional fuel oil was supplied, it was confirmed that the hot spot higher than 1003 K which was the desired temperature occurred.

Thus, it was confirmed that the hot spot occurring in the catalyst regenerator occurred when flammable gas was accompanied by strong combustion inside relatively large air bubbles.

In conclusion, it was shown that in the circulating fluidized bed catalytic naphtha cracking process which produced light olefins by the circulating fluidized bed reactor using the electric heating furnace according to the present invention, a hot spot at temperature lower than a hot spot occurring when supplying an additional fuel oil occurred, so that a uniform temperature gradient was shown, and thus, catalytic activity was maintained to maintain the yield of the entire reaction.

<Example 2> Regenerator Including Electric Heating Furnace Having Heating Rod Diameter of 34 mm Calculation for confirming whether the electric heating furnace in the regenerator of the circulating fluidized bed catalytic naphtha cracking process which produced light olefins confirmed in Example 1 was able to be installed in a commercial scale size was performed.

When the regenerator was designed based on annual olefin production of 1 million ton per year, the regenerator had a diameter of 13.5 m and a height of 15.3 m, and heating energy required for catalyst regeneration after the naphtha reaction corresponded to 189 MW. Thermal conductivity was set based on Inconel heater, and as the heat transfer efficiency of a bubble fluidized bed, 250 W/m²·° C. which is a normal range was applied. At this time, the heating rod was able to be designed as a pin type for improving heat transfer efficiency, and considering this, the heat transfer efficiency of the fluidized area corresponded to 500 W/m²·° C. Calculation was performed based on the surface temperature of the heating rod in the regenerator of 900° C., the diameter of the heating rod of 34 mm, and the height of the heating rod of 7 m.

<Example 3> Regenerator Including Electric Heating Furnace Having Heating Rod Diameter of 61 mm The generator including the same electric heating furnace as that of Example 2 except that the diameter of the heating rod was 61 mm was used.

<Example 4> Regenerator Including Electric Heating Furnace Having Heating Rod Diameter of 89 mm The generator including the same electric heating furnace as that of Example 2 except that the diameter of the heating rod was 89 mm was used.

<Example 5> Regenerator Including Electric Heating Furnace Having Heating Rod Diameter of 114 mm The generator including the same electric heating furnace as that of Example 2 except that the diameter of the heating rod was 114 mm was used.

<Example 6> Regenerator Including Electric Heating Furnace Having Heating Rod Diameter of 140 mm The generator including the same electric heating furnace as that of Example 2 except that the diameter of the heating rod was 140 mm was used.

<Experimental Example 2> Design of Regenerator Including Electric Heating Furnace The results of designing the regenerators including the electric heating furnaces according to Examples 2 to 6 are shown in the following Table 3. As the diameter of the heating rod was larger and the surface temperature of the heating rod was higher, the heat transfer efficiency by radiation, convection, and conduction was increased, and thus, the number of the heating rods was decreased. That is, when the diameter of the heating rod was 34 mm, 61 mm, 89 mm, 114 mm, and 140 mm, the number of the heating rods needed corresponded to 1820, 1022, 701, 546, and 454, respectively, based on the surface temperature of 900° C.

In addition, when the heating rod having a diameter of 61 mm was disposed according to Example 3, the number of the heating rods needed per unit area (m²) was 7 and the distance between the heating rods was able to be designed as 330 mm, and when the heating rod having a diameter of 114 mm was disposed according to Example 5, the number of the heating rods needed per unit area (m²) was 4 and the distance between the heating rods was able to be designed as 660 mm.

TABLE 3

| | Example 2 | Example 3 | Example 4 | Example 5 | Example 6 | Unit |
|---|---|---|---|---|---|---|
| Supply amount of naphtha | 236,700 | 236,700 | 236,700 | 236,700 | 236,700 | kg/h |
| Production amount of olefin | 1,000,000 | 1,000,000 | 1,000,000 | 1,000,000 | 1,000,000 | ton/year |
| Required heat flux | 189 | 189 | 189 | 189 | 189 | MW |
| Diameter of regenerator | 13.44 | 13.50 | 13.57 | 13.63 | 13.69 | m |
| Height of regenerator | 15.3 | 15.3 | 15.3 | 15.3 | 15.3 | m |
| Thermal conductivity | 11 | 11 | 11 | 11 | 11 | W/m · ° C. |
| Heat transfer coefficient of reactor | 500 | 500 | 500 | 500 | 500 | W/m² · ° C. |
| Surface temperature of heating rod | 900 | 900 | 900 | 900 | 900 | ° C. |
| Diameter of heating rod | 34 | 61 | 89 | 114 | 140 | mm |
| Height of heating rod | 7 | 7 | 7 | 7 | 7 | m |
| Convention/conduction energy | 58.98 | 105.13 | 151.96 | 195.03 | 231.76 | kW/heating rod |
| Radiant energy | 44.84 | 79.80 | 117.52 | 150.76 | 184.39 | kW/heating rod |
| Number of heating rods | 1820 | 1022 | 701 | 546 | 454 | Number |
| Density of heating furnace | 12.8 | 7.1 | 4.8 | 3.7 | 3.1 | Number per m² |

In conclusion, it was confirmed that in the circulating fluidized bed catalytic naphtha cracking process which produced light olefins by the circulating fluidized bed reactor using the electric heating furnace according to the present invention, a hot spot at temperature lower than a hot spot occurring when supplying and additional fuel oil occurred, so that a uniform temperature gradient was shown, and thus, catalytic activity was maintained to maintain the yield of the entire reaction, and the electric heating furnace in the regenerator in the circulating fluidized bed catalytic naphtha cracking process was able to be installed in a commercial scale size.

The invention claimed is:

1. A circulating fluidized bed reactor comprising: a reactor, a stripper, and a regenerator,
   wherein an electric heating furnace including a heating body is installed in the regenerator.

2. The circulating fluidized bed reactor of claim 1, wherein a heating method of the electric heating furnace installed in the regenerator is resistance heating.

3. The circulating fluidized bed reactor of claim 1, wherein the heating body is a form of a heating rod.

4. The circulating fluidized bed reactor of claim 3, wherein a surface temperature of the heating rod is 750 to 1200° C.

5. The circulating fluidized bed reactor of claim 3, wherein a diameter of the heating rod (pipe outside diameter) is 1 to 15 cm.

6. The circulating fluidized bed reactor of claim 3, wherein the number of the heating rods per unit area ($m^2$) of the regenerator is 1 to 15.

7. The circulating fluidized bed reactor of claim 3, wherein a distance between the heating rods is 15 to 85 cm.

8. The circulating fluidized bed reactor of claim 1, wherein a spherical or oval catalyst including a binder and a matrix circulates in the circulating fluidized bed reactor.

9. The circulating fluidized bed reactor of claim 8, wherein the catalyst has a diameter of 10 to 250 μm.

10. The circulating fluidized bed reactor of claim 1, wherein the circulating fluidized bed reactor is used in a circulating fluidized bed catalytic naphtha cracking process.

11. A method of producing light olefins by cracking naphtha using the circulating fluidized bed reactor of claim 1.

12. The method of producing light olefins of claim 11, wherein the naphtha is $C_4$ to $C_{15}$ saturated hydrocarbons or unsaturated hydrocarbons.

13. The method of producing light olefins of claim 11, wherein the naphtha is one or more selected from the group consisting of full-range naphtha, light naphtha, raffinate oil, plastic pyrolysis oil, biomass pyrolysis oil, and a mixture thereof.

14. A method of improving a yield of light olefins by cracking naphtha using the circulating fluidized bed reactor of claim 1.

* * * * *